United States Patent
Keil (10) Patent No.: US 8,112,922 B2
(45) Date of Patent: Feb. 14, 2012

(54) REFLECTIVE MATERIAL FOR SIGNAGE, BUILDINGS AND VEHICLES

(76) Inventor: Stanley Keil, Downsview (CA)

(*) Notice: Subject to any disclaimer, the term of this patent is extended or adjusted under 35 U.S.C. 154(b) by 146 days.

(21) Appl. No.: 12/256,686

(22) Filed: Oct. 23, 2008

(65) Prior Publication Data

US 2010/0101126 A1 Apr. 29, 2010

(51) Int. Cl.
*G09F 19/00* (2006.01)
(52) U.S. Cl. .......................... 40/582; 40/615
(58) Field of Classification Search ............ 40/582, 40/615, 616
See application file for complete search history.

(56) References Cited

U.S. PATENT DOCUMENTS

| | | | |
|---|---|---|---|
| 1,670,327 A | 5/1928 | Tobener | |
| 1,732,822 A | 10/1929 | Wehr et al. | |
| 2,004,635 A | 6/1935 | Price | |
| 2,193,057 A | 3/1940 | Carver | |
| 2,310,790 A * | 2/1943 | Jungersen | 359/547 |
| 2,882,631 A | 4/1959 | Boone | |
| 3,578,538 A | 5/1971 | Prosser et al. | |
| 3,651,590 A * | 3/1972 | Thomas | 40/615 |
| 5,050,327 A | 9/1991 | Woltman | |
| 5,536,558 A | 7/1996 | Shelton | |
| 6,612,055 B2 | 9/2003 | Bradford | |
| 6,770,225 B2 * | 8/2004 | Nilsen et al. | 264/1.9 |
| 6,997,053 B2 * | 2/2006 | Forshey et al. | 73/296 |
| 7,125,353 B2 * | 10/2006 | Blount | 473/568 |
| 7,152,353 B2 | 12/2006 | Jurkovic | |

* cited by examiner

*Primary Examiner* — Casandra Davis
(74) *Attorney, Agent, or Firm* — Young Basile Hanlon & MacFarlane PC

(57) ABSTRACT

A reflective sheet material for use on exterior signs and exposed surfaces includes a sheet member having a series of adjacent, parallel primary grooves extending across at least one surface. Each group is defined by first and second elongate facets forming an angle of at least 90 degrees in a plane perpendicular to the surface and to the length of the facets. A thin opaque, reflective layer extends over the surface in the region of the grooves and conforms to the series of grooves so as to form a series of associated angular grooves. A transparent material extends over and substantially fills these angular grooves, thereby forming a substantially smooth outer surface which is located at or close to the top edges of the grooves. The sheet material can be flexible or rigid.

9 Claims, 4 Drawing Sheets

REFLECTIVE MATERIAL FOR SIGNAGE, BUILDINGS AND VEHICLES

BACKGROUND OF THE INVENTION

This invention relates to reflective sheet material for use on exterior signs, buildings and vehicles, signs made with this material, and methods of making reflective sheet material.

Reflective sheet materials for use on exterior signs, buildings, vehicles and various supporting surfaces are known and have been used for a number of years. For example, it is well known to construct stop signs and other road signs using reflective material on the front surface of the sign so that the sign can be readily seen, particularly at night or in low light conditions. The use of reflective material on vehicles is also common in order that others can see a vehicle easily at night from the reflection of headlights off the material. The use of reflective material can reduce the need for or eliminate the need for the use of electrical lights in a sign so that it can be easily seen or so that it will attract attention. The use of reflective material can provide the sign, vehicle or building with an original and striking appearance and often at a reasonable cost.

One common form of sign used by many stores is the so-called "neon sign" which uses electricity to power neon tubes. However, such signs have several disadvantages including a relatively high cost. Also, the type and complexity of the images that can be produced by neon tubes is somewhat limited. Because electricity is required to power such neon signs, the expense of operating same, particularly for an extended period of time, can be significant.

U.S. Pat. No. 2,193,057 issued Mar. 12, 1940 to N. P. Carver teaches a sign construction which employs a rigid back support and a front stenciled member in which are formed cutouts or openings forming desired letters of the sign. Mounted behind the stenciled member is a panel made of transparent or translucent material such as glass or a suitable synthetic resin. The front surface of this panel comprises a pebbled surface in order to disseminate incoming light rays throughout the panel. In one embodiment, this panel has a prismatic rear face for refracting the light rays entering the pebbled surface and reflecting them out of the panel towards a motorist, for example. The rear face of this panel can be covered with a lustrous finish or coating which is said to enhance the reflecting of the light rays.

More recent U.S. Pat. No. 6,612,055 describes and illustrates another sign panel which can use ambient light. This panel employs a transparent, phosphorescent, plastic sheet having a rearward surface in which grooves are formed in order to outline desired indicia. Additional grooves are also provided in the rearward surface, these forming hatch patterns within the outlines of the selected indicia, which are also viewable from the forward surface. This sign panel relies on light that is transferred through the sheet in a direction perpendicular to its forward and rearward planar surfaces.

U.S. Pat. No. 3,651,590 issued Mar. 28, 1972 to F. O. Thomas describes a sign with indicia shaped apertures in an outer framework. The apertures expose a reflective core mounted in a recess within the framework. The textured surfaces provided in the reflective core are said to provide multi-directional reflectivity that contrasts with the outer framework. In particular, the core can be made with clear plastic front and back sheets and between these sheets is a textured, metalized inner surface that can be formed by a series of parallel grooves formed in the adjacent surfaces of the two sheets. A metallic layer can be provided on the grooved surfaces to achieve the reflective surface.

There is a need for an improved reflective sheet material that can be used in the construction of exterior signs and the provision of reflective surfaces on vehicles and buildings and that can be made at a reasonable cost. In particular there remains a need for an improved reflective sheet material that can efficiently use ambient light so as to provide an enhanced light reflecting capability in order to provide better signs and better reflecting surfaces.

SUMMARY OF THE DISCLOSURE

According to one embodiment of the reflective sheet material for signage, vehicle surfaces and building surfaces of this disclosure, the sheet material includes a sheet member having a series of adjacent, parallel primary grooves extending across at least one surface, each primary groove defined by first and second elongate facets forming an angle of at least 90 degrees in a first plane perpendicular to at least one surface and perpendicular to the lengthwise direction of the facets. The grooves have a depth which is less than the thickness of the sheet member. A thin opaque, reflective layer extends over and is attached to the at least one surface in the region of the series of primary grooves. The reflective layer conforms to the series of primary grooves so as to form a series of associated angular grooves defined by elongate reflective facets. A transparent material extends over and substantially fills the associated angular grooves in the reflective layer. The transparent material forms a substantially smooth outer surface of the sheet material located at or close to the top edges of the associated grooves.

In a particular version of this embodiment, the sheet material is flexible and the sheet member and transparent material are both made of flexible plastics material. The reflective material can be made of thin metal foil.

According to one embodiment of a sign constructed according to this disclosure, a sign comprises a reflecting substrate made of the aforementioned sheet material and an opaque cover layer extending over and connected to the substrate and having at least one opening formed therein defining at least one indicium. A portion or portions of the reflecting substrate are revealed through the at least one opening. The associated angular grooves of the sheet material face towards the cover layer.

In a particular version of this sign, the cover layer is a vinyl sheet which is bonded by adhesive to the smooth outer surface of the sheet material formed by the transparent material.

In one embodiment of a method of producing reflective sheet material according to the present disclosure, the method includes molding a plastic sheet member having a series of adjacent, parallel grooves extending across a front surface thereof, each groove defined by first and second elongate facets forming an angle in a plane perpendicular to the facets. The grooves each have a maximum depth less than a maximum thickness of a sheet member. A thin reflective foil layer is applied to the front surface so that the foil layer conforms to and is shaped by the series of grooves and thereby forms a series of associated angular grooves defined by pairs of elongate, reflective facets. A transparent, hardenable material in a liquid or plasticized state is applied to the foil layer so as to fill the angular grooves. The transparent material is allowed to harden and form a smooth front surface of the sheet material. The hardened transparent material has a maximum thickness which is equal to or not substantially more than the depth of the angular grooves.

In a particular, exemplary version of this method, the grooves are shallow in depth relative to the thickness of the sheet member and the angle formed by the first and second facets is an obtuse angle.

According to another embodiment of a method of manufacturing reflective sheet material according to the present disclosure, the method includes providing a sheet member having a series of adjacent, parallel grooves extending across a front surface thereof, each groove defined by first and second elongate facets forming an angle in a plane perpendicular to the facets. The grooves have a maximum depth less than a maximum thickness of the sheet member. A reflective metallic layer is formed on the front surface so that the reflective layer conforms to and is shaped by the series of grooves and thereby forms a series of adjacent-angular grooves defined by pairs of elongate, reflective facets. A transparent, hardenable plastics material in a liquid or plasticized state is applied to the metallic layer so as to fill the angular grooves and then this plastics material is allowed to harden and form a smooth front surface of the sheet material.

In one particular embodiment of this method, the sheet material is substantially rigid and made of glass or acrylic plastic and the parallel grooves are formed in the sheet member by laser etching.

These and other aspects of the disclosed reflective sheet materials, signs, and methods of making same will become more readily apparent to those having ordinary skill in the art from the following detailed description taken in conjunction with the accompanying drawings.

BRIEF DESCRIPTION OF THE DRAWINGS

So that those having ordinary skill in the art to which the present disclosure pertains will more readily understand how to make and use the subject invention, exemplary embodiments thereof will be described in detail herein below with reference to the drawings, wherein.

DETAILED DESCRIPTION OF THE PREFERRED EMBODIMENT

Figure 1:
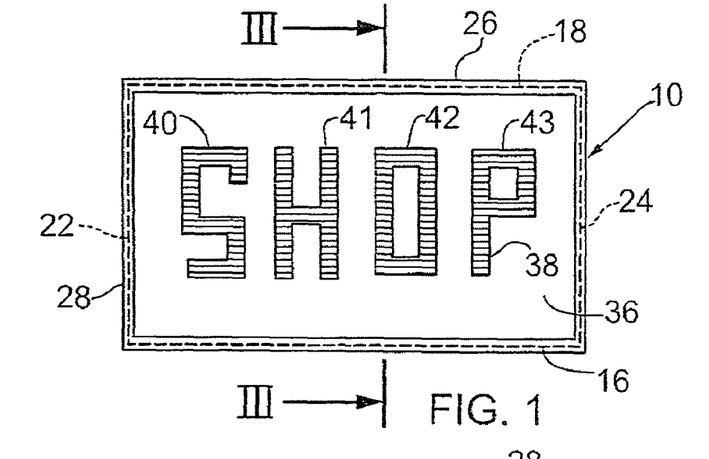
FIG. 1 is a front view of a sign constructed with reflective sheet material of the present disclosure.
Figure 2:
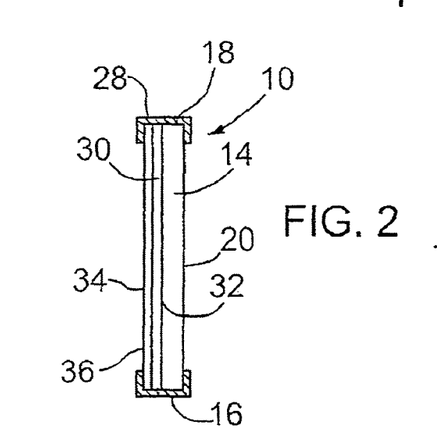
FIG. 2 is a right edge view of the sign of FIG. 1 with the right edge section of the frame omitted for illustration purposes.
Figure 3:
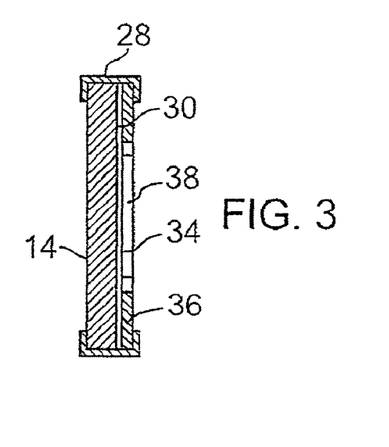
FIG. 3 is a vertical cross section of the sign of FIG. 1 taken along the line
Figure 4:
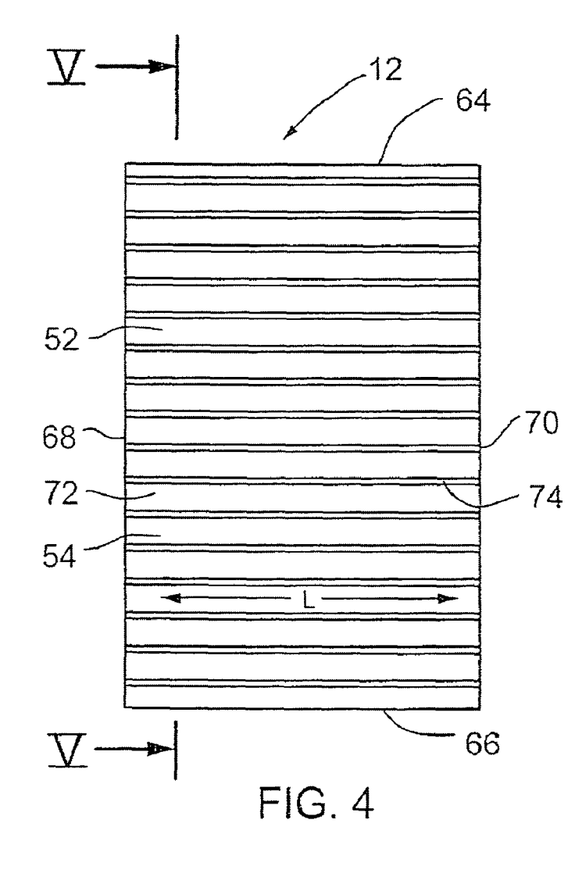
FIG. 4 is a front view of reflective sheet material constructed according to the present disclosure.
Figure 5:
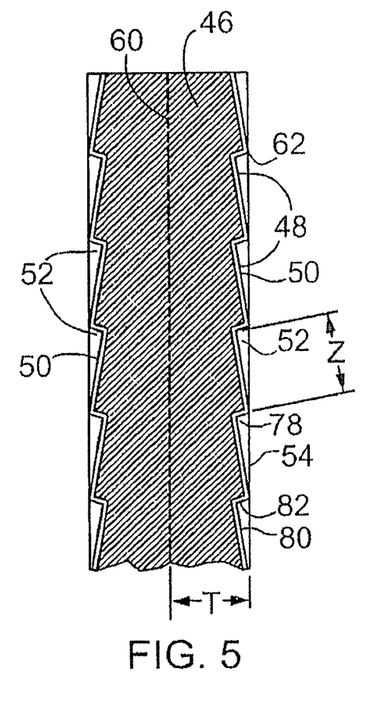
FIG. 5 is a vertical cross section of part of the sheet material of FIG. 4 taken along the line V-V.

Shown in FIGS. 1 to 3 is a sign 10 constructed according to the present disclosure. This sign incorporates reflective sheet material 12 and one form of this material is shown in FIGS. 4 and 5. Although one form of sign is shown in FIGS. 1 to 3, it will be appreciated by those skilled in the art that the present signs can take various forms depending on their usage, location, and the individual requirements of the sign owner. Thus usage of the reflective sheet material described and illustrated in the present specification is not confined to the particular form of sign illustrated in FIGS. 1 to 3. Moreover, use of the present reflective sheet material is not confined to signs alone. This material can also be used on vehicle surfaces, such as the exterior surface of a truck or other commercial vehicle, and on building surfaces. When used on a vehicle such as a truck, the sheet material can be used to form a sign in the form of lettering and/or designs for decorative purposes and for safety purposes. It will be appreciated that the use of the present reflective sheet material on a vehicle, such as a rearwardly facing panel of the vehicle, can make the vehicle easier to see at night and in the daytime because of its ability to reflect light towards other vehicles and their drivers. However, care should be taken to avoid the use of an excessive amount of the reflective sheet material on a vehicle in order to avoid any significant danger of blinding the drivers of other vehicles, particularly in bright sunshine conditions. The present reflective sheet material can be used on a building in order to enhance the appearance of a building and even to make the building more noticeable to passersby or to give it a unique appearance.

In the case of the illustrated sign 10, the sign is provided with a rigid support member or backboard 14 which as illustrated is rectangular and has a bottom edge 16, a top edge 18, and a rear surface 20 which is flat. Extending between the top and bottom edges are two opposite side edges 22 and 24. The backboard can be made of a variety of materials but, if the sign is to be used outdoors, the selected materials should be capable of withstanding various weather conditions, including rain. Examples of material that can be used for the backboard include wood, metal, glass and a durable, rigid plastics material. The illustrated sign includes a rectangular supporting frame 26 made with four channel frame members 28 rigidly connected to one another at the four corners of the frame. The frame members can be made of wood, extruded plastic or a suitable metal such as aluminum or galvanized steel. One of the frame members can be detachably connected at its opposite ends by means of screws if desired. Supporting frames of this type are well known in the sign industry. It will be appreciated that the sign can be supported in a variety of other ways well known in the sign industry. For example, the backboard could be rigidly mounted to a supporting surface, such as a mounting plate or a vertical wall of a building by means of a suitable adhesive or threaded fasteners. It is also possible to use a clear glass sheet as a frontal support for the sign with the reflective sheet material mounted behind the glass sheet and a background layer (as explained further below).

In a primary version of the present sign a reflecting substrate 30 comprising reflective sheet material constructed according to the present disclosure is mounted on a front surface of the backboard. In order to construct the sign 10, according to one method of construction, the substrate can be cut from a larger, standard sheet member to the required dimensions, for example the length and width of the backboard 14 in the case of the sign 10. The reflecting substrate has a flat rear surface at 32, which can be attached by suitable adhesive to the front surface of the backboard. The adhesive can be a pressure sensitive adhesive which can be applied when the sheet material is made and covered with a release sheet which can easily be removed to make the sign. In a manner known in the adhesive industry, the release sheet is silicon coated for release purposes. Other forms of attachment are also possible, for example fasteners such as screws extending through holes in the reflecting substrate and into the material of the backboard.

In order to form a sign with lettering or other indicia such as numbers, a so-called "background layer" can be mounted on the front surface 34 of the reflecting substrate. A common form of background material used in signs is a flexible, vinyl sheet made with a suitable color on the side that will be visible. For exterior (outdoor) signs, an exemplary vinyl sheet material is cast vinyl having a thickness of 2 mil. On the sign 10, the background can comprise an opaque cover layer 36 extending over the reflecting substrate and having at least one opening 38 formed therein and forming at least one indicium. In the particular case of sign 10 shown in FIG. 1, there are four such openings 38 in order to provide the four letters "S, H, O and P" forming the word "SHOP". The portion or portions of the reflecting substrate 30 are revealed through the at least one opening 38. In the case of FIG. 1, four portions 40 to 43 of the reflecting substrate are revealed through four openings in the cover layer. Methods of quickly forming the openings 38 that form the indicia in the vinyl sheet are known in the sign making industry and need not be described in detail herein. Computer based equipment capable of controlling a cutting knife or blade can be used for this purpose. By the use of such equipment, it is possible in a known manner to design a sign on a virtual screen or display before the automatic cutting equipment is used to actually cut openings in the vinyl or other plastic layer forming the background for the sign. Such equipment can also be used to form openings in the shape of logos or trademarks that are to be displayed by the sign. If a clear glass sheet is being used as a frontal support member for the sign, the sign letters, logos, etc., are formed in reverse (mirror image) in the background layer before it is adhered to the reflecting substrate and the back surface of the glass sheet. It is also possible to provide the background layer by a so-called "silk screening" process which is a process commonly used in making signs, etc. This process can be suitable if the sign is to be made in a sufficiently large quantity i.e. fifty or more.

Figure 6:
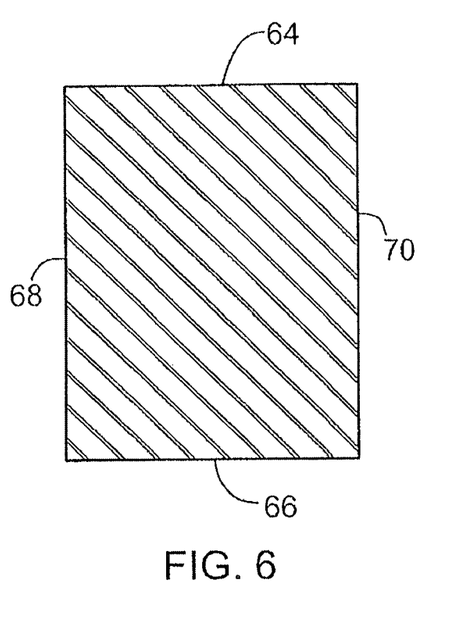
FIG. 6 is a front view of another embodiment of the reflective sheet material having reflective facets extending at an angle to the edges of the material.
Figure 7:
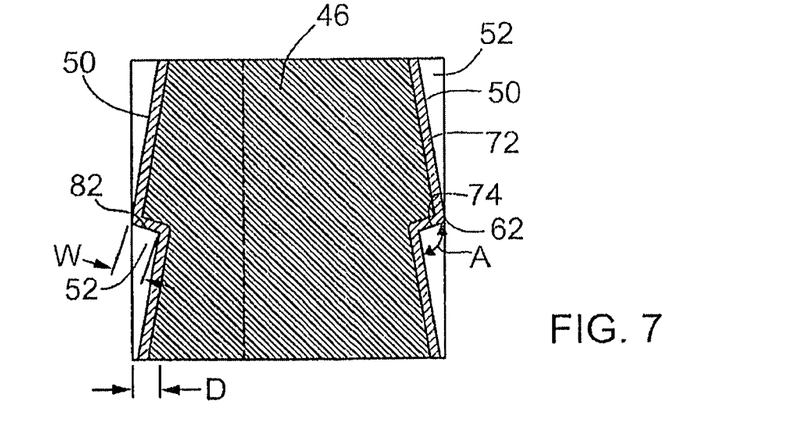
FIG. 7 is a detail view in cross section of the upper end section of the reflective sheet material shown in FIG. 5.

Turning now to the construction of the reflective sheet material itself and with particular reference to the detail views of this material provided by FIGS. 5 and 7, the sheet material comprises three principal components or sections including a sheet member 46 having at least one series of adjacent, parallel primary grooves 48, a thin, opaque reflective layer 50, and a transparent material 52 that forms a substantially smooth outer surface of the sheet material. One such smooth outer surface is indicated at 54 in FIGS. 4, 5 and 7. The sheet member 46 can be a relatively thin, flexible material such as a suitable plastic material having sufficient strength and durability. In the case of a flexible sheet member, the thickness of the sheet member as measured from its rear surface, which can be flat, to the upper edges 62 of the grooves, can range between ⅛ inch and ¾ inch depending upon the particular sign requirements, the amount of flexibility required, the manner in which the sheet material will be supported, etc. In the particular exemplary embodiment, the thickness T is 5/16 of an inch, this material having a flat rear surface that can be attached to a rigid, flat supporting member such as the aforementioned backboard 14. Desirably, the sheet member, and the sheet material formed thereby, can be manufactured in relatively large, rectangular sheets as indicated by FIGS. 4 and 6, these sheets having straight, opposite end edges 64 and 66 and opposite straight side edges 68 and 70. A sign manufacturer can purchase these rectangular sheets having standard length and width, for example, 4 feet×8 feet, and can then subsequently cut up these sheets based on particular sign requirements. In this way, three, four or more signs can be constructed with the use of a single, standard sized sheet of the reflective sheet material 12.

The aforementioned primary grooves are each defined by first and second elongate facets or surfaces 72, 74 forming an angle A of at least 90 degrees in a first plane perpendicular to the at least one surface in which the primary grooves are formed and perpendicular to the lengthwise direction of the facets, this direction being indicated by the double-ended arrow L in FIG. 4. The aforementioned first plane in which the angle A is located is a plane parallel to the cross-sectional plane V-V indicated in FIG. 4. Also, as currently shown in FIGS. 5 and 7, the grooves 48 have a depth which is less than the thickness of the sheet member 46 and, in exemplary embodiment, the grooves 48 have a depth which is substantially less than the thickness of the sheet member.

Instead of constructing the sheet member 46 of flexible material, in some versions of the sheet material, the sheet material is substantially rigid and the sheet member 46 is constructed of a rigid material such as glass, which can be opaque or transparent. The sheet can also be made of a rigid or semi-rigid plastic material, such as acrylic plastic, polycarbonate and polyvinyl chloride (PVC). The selected material should be capable of resisting warping due to heat build-up because of heat absorption from the sun, particularly when a dark cover layer or background extends over portions of its front surface and the reflecting sheet material or the sign constructed therefrom is outdoors and exposed to the sun's rays. It will be understood that in the case of a plastic sheet material, the rigidity of the sheet or its flexibility can be dependent on the thickness of the sheet.

Because the reflective layer 50 extends over and is attached to the surface of the sheet member 46 in the region of the primary grooves 48, the reflective layer conforms to the series of primary grooves so as to form a series of associated angular grooves 78 defined by elongate, reflective facets 80, 82. The reflective layer can be made of thin metal foil. In a particular, exemplary embodiment, this foil can be made of aluminum or aluminum alloy which will not corrode and which is relatively inexpensive. However, it is possible that the foil can be made of other metals such as copper or precious metal such as gold and silver. A burnished gold foil can be particularly desirable for decorative purposes, for example where the reflective sheet material is being used on the exterior of a prestigious office building where the cost of the gold foil can be justified. The foil can be attached to the sheet member by the use of a suitable adhesive applied to either the grooved surface of the sheet member or to the foil and then by suitable pressing or stamping in order to apply the foil tightly to the grooved surface without any air pockets between the sheet member and the foil. This manner of attachment can be used whether the sheet member is made of flexible or rigid plastic or made of rigid glass or a resinous glass substitute such as an acrylic plastic, commonly sold under the trade mark Plexiglas.

Another way of forming the reflective layer over the primary grooves is by means of vacuum deposition of metal powder on the grooved surface of the sheet member. As vacuum deposition for forming a metallic surface on an object is a known manufacturing process, a detailed description herein is deemed unnecessary. The metallic powder for the vacuum deposition step can be selected from the group comprising aluminum powder, gold powder or dust, copper powder and silver powder. In an exemplary form of this type of reflective layer, the powder selected is aluminum because of its relatively low cost and resistance to corrosion. According to an alternative method of forming the reflective metallic layer using metal powder, an adhesive layer is first applied to the elongate facets that form the primary grooves 48 using any suitable coating methods, such as brush or roller application and then the metallic powder is applied to this adhesive layer.

Turning now to the provision of the transparent material 52, this material extends over and substantially fills the angular grooves 78 formed in the reflective layer. The transparent material, which can be a suitable plastics material or resin, forms the substantially smooth outer surface 54 of the sheet material, this surface being located at or close to the top edges of the groove 78. In the case of the sheet material being flexible, the transparent material 52 is made of a suitable flexible plastics material. This transparent material can be color tinted to provide a color effect, if desired. The color tint can be red, green, etc.

It is a feature of the present reflective sheet material that the transparent plastics material or resin 52 has a maximum thickness which is not substantially more than the maximum depth of the angular grooves 78 in the metallic layer, this maximum depth being indicated as the depth D in FIG. 7. In a particular exemplary embodiment, the transparent material 52 has a maximum thickness which is about equal to the depth of the angular grooves in the metallic layer, that is the depth D. If the plastics material 52 which fills the grooves is significantly thicker than the depth D, this will negatively affect the reflective capability of the sheet material 12. In particular, a thick layer of the transparent material 52 will cause shadows to be created on the reflective front surface and thereby negatively affect the reflection of light striking its surface.

Another significant parameter to be considered in the construction of the reflective sheet material is the size of the angle A formed by the reflective facets 80, 82. In an exemplary embodiment, the angle A is an obtuse angle. The advantage of this obtuse angle is that the upper facets 74 (when the sheet material is arranged vertically in the manner shown in FIGS. 5 and 7) will interfere less with the light from the sky striking the lower facets 72, thus providing a sheet material which has greater reflective capability for many uses of this material. In one exemplary form of the sheet material the angle A is in the range of 100 to 150 degrees. In a particular exemplary embodiment, the range of this obtuse angle is between 100 and 120 degrees.

Also, as clearly shown in FIGS. 5 and 7, each first facet 82 of each groove has a width w extending in the first plane (that is the plane parallel to the cross-sectional plane V-V of FIG. 4) which is substantially shorter than a corresponding width of the second facet 80 indicated by the distance Z in FIG. 5. An additional parameter concerning the reflecting facets 80, 82 is the angle to which each of these facets extends relative to a plane or two-dimensional surface defined by the top edges of the angular groove 78. In one exemplary embodiment, the first and smaller facet 82 extends at an angle ranging between 50 and 80 degrees to this plane and in a particular exemplary embodiment, the angle in which this first facet extends ranges from 60 to 80 degrees. The second and larger facet 80 in an exemplary embodiment extends at an angle ranging between 10 and 30 degrees to the second plane which is defined by the top edges of the groove. In a particular exemplary embodiment, the range of slope of this facet is between 10 and 20 degrees.

In the embodiment of the sheet material shown in FIG. 4, the grooves, together with their elongate facets, extend transversely across the width of the sheet material, that is perpendicular to the side edges 68, 70. However, in another embodiment illustrated in FIG. 6, the grooves and their respective facets extend at a substantial acute angle to the end edges 64, 66 and the opposite side edges 68, 70. In the illustrated sheet material of FIG. 6 the acute angle is about 45 degrees but one will appreciate that the acute angle can vary. For example, in an exemplary form of this embodiment, the range of the acute angle can be between 30 and 60 degrees. The size of the angle can be selected on the basis of the lighting conditions in which the material is to be used and the reflecting effect desired by the user. In one particular embodiment of this type of sheet materials, the grooves and their respective facets run diagonally from sinister to dexter base. It is equally possible for the grooves to slope in the opposite direction, that is from dexter edge to sinister edge of the material.

As clearly shown in FIGS. 5 and 7, an alternate form of the sheet material has similar grooves formed on both surfaces of the sheet material. Thus, in the illustrated embodiment, there are two thin opaque reflecting layers 50, which extend over opposite sides of the sheet member 46. Both of these reflecting layers extend over primary grooves formed on opposite surfaces of the sheet member which, in this embodiment, can be made thicker to make the sheet member more rigid and self supporting, since the sheet member is not intended to be bonded or adhered to an adjacent support member, such as the backboard 14. The use of this double sided sheet material can facilitate faster and more convenient manufacturing of two sided reflecting signs. Alternatively, it is possible to arrange two reflective sheet members, each of which has a flat rear surface and a reflecting front surface in a back-to-back manner with the rear surfaces bonded or otherwise attached to one another. Such a combined reflective sheet member can then be used in the construction of a two-sided sign with a rectangular supporting frame which can, for example, be arranged around the reflecting sheet member in order to support same.

The present reflective sheet material can be manufactured in a substantially rectangular form when the material is laid out flat, as indicated by FIGS. 4 and 6. Of course, these rectangular sheets can be much larger than indicated by FIGS. 4 and 6, which are not drawn to scale. For example, the manufactured sheets can be 8 or more feet long and 4 or more feet wide.

It will be appreciated from the above that a distinct advantage of the described sheet material, particularly for sign manufacturing purposes, is that the provision of the transparent material 52 over the grooved surface provides a smooth outer surface on which an opaque cover layer such as the vinyl sheet can be bonded readily by adhesive. Otherwise, it is difficult to secure a cover layer forming a background that creates the lettering on a surface covered with adjacent, parallel grooves. Also note that because of the use of the opaque cover layer, which can have a thickness in the range of 1 to 5 mil depending on the material used, the cover layer creates a need for the transparent material 52 to not extend substantially beyond the edges of the grooves (thereby reducing the shadow created by the cover layer on the reflecting facet). In a particular exemplary form, the cover layer has a thickness of 2 mil. Such vinyl material is sold by 3M Corporation under the trade mark Scotchcal.

In an exemplary form of the sheet material of the present disclosure, the primary grooves 48 and the associated angular grooves 78 formed by the reflecting material have a uniform maximum depth so that the effect of the reflection does not vary across the front surface of the sheet. In an exemplary version of the sheet material, this uniform maximum depth of the angular grooves 78 does not exceed 40% of the maximum thickness of the sheet member (for example the distance T indicated in FIG. 5). In a particular exemplary embodiment the maximum depth of the grooves does not exceed 20% of the thickness of the sheet of the member.

Figure 8:
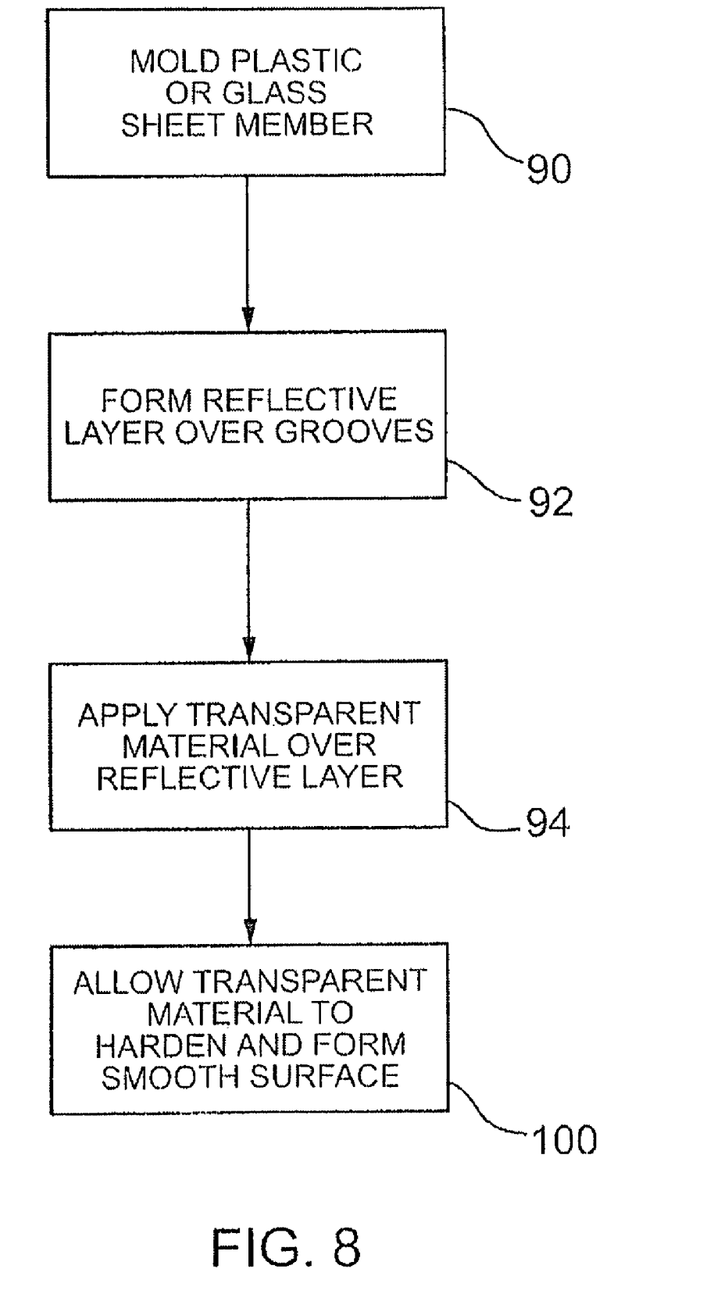
FIG. 8 is a block diagram illustrating steps according to one method of producing the reflective sheet material of the present disclosure.

One method of producing a reflective sheet material according to the present disclosure is illustrated in FIG. 8. According to this method, the plastic sheet member 46 is produced in a suitable mould in step 90 using plasticized, heated plastic material or resin, the molding process creating the series of adjacent, parallel grooves 48 extending across a front surface of the sheet member and having smooth surfaces. A similar molding process can also be used to provide a series of parallel grooves on both sides of the sheet member, if desired. It is also possible to mould a rigid glass sheet in a mould so that it has the series of grooves 48 in one or both of its surfaces. After such a sheet member has been formed in the mould, the reflective layer 50 can be applied to the front surface in step 92 in a manner that consistently requires the layer to conform to and be shaped by the series of grooves in the moulded plastic or glass sheet member. This can be accomplished by means of a suitable press that forces a flat, metallic foil layer into the grooves, thereby forming the series of associated angular grooves 78. If a sufficient bond is not formed by this pressing process between the metallic foil layer and the underlying sheet member, then an adhesive layer can be applied either to the sheet member or to the foil layer first before the foil layer is pressed onto the plastic sheet member. After the foil layer is firmly attached, a transparent hardenable material in a liquid or plasticized state is applied to the foil layer at step 94 in a manner which fills the angular grooves. The transparent material can be applied by spraying or by brush if it is in the form of a liquid. Then this transparent material 52 is allowed to harden, generally by a curing process indicated at step 100. As a result, a smooth front surface is formed on the sheet material. The maximum thickness of the hardened transparent material is either equal to or not substantially more than (i.e. not more than 1/16 inch) the depth of the angular grooves 78. In an exemplary form of this manufacturing process, the grooves formed by the moulding are shallow in depth relative to the thickness of the sheet member. Also the angle formed by the first and second facets of each groove is an obtuse angle. The sheet material made by this method can either be flexible or rigid as desired. Also, if desired, the manufacturing method can include the additional step of applying at least a layer of adhesive material to a rear surface of the sheet member for the purpose of attaching the sheet member to a supporting surface such as the backboard 14.

Figure 9:
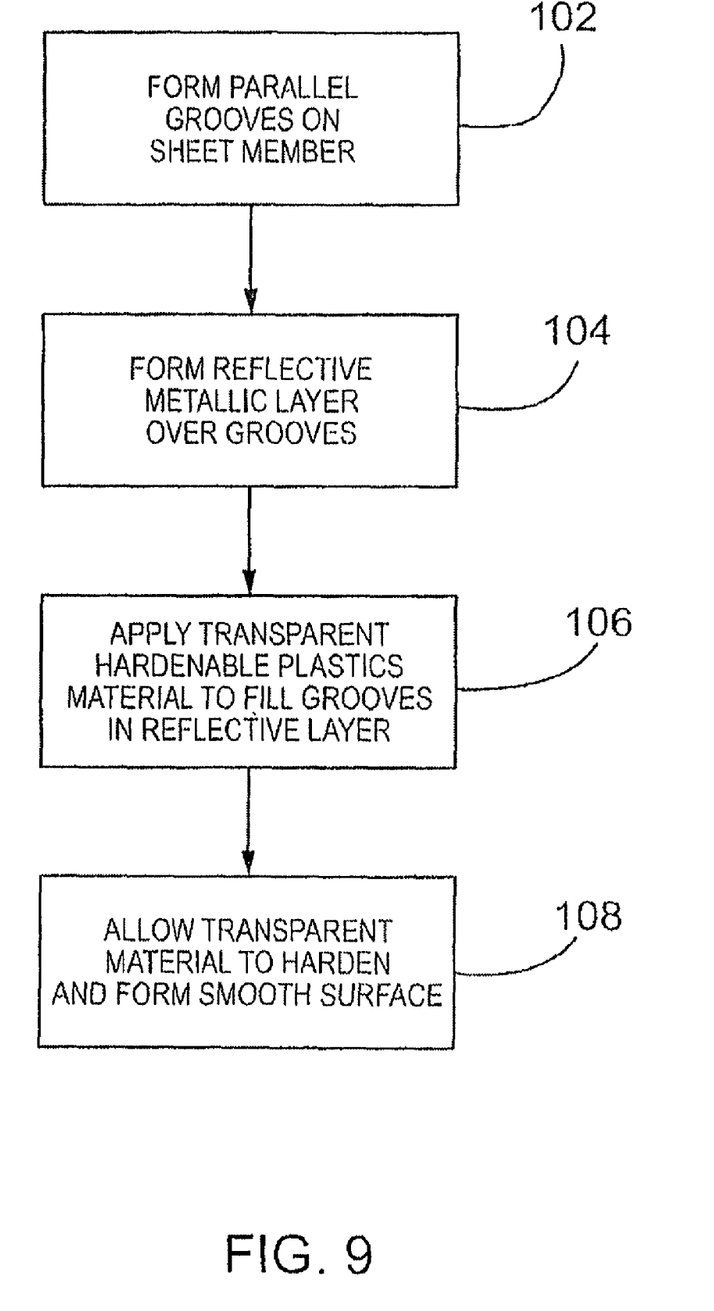
FIG. 9 is a block diagram illustrating an alternative method of manufacturing the reflective sheet material of the disclosure.

An alternative manufacturing method for the reflective sheet material is illustrated by FIG. 9. According to this method, the sheet member 46 which is initially provided is not necessarily formed by molding or formed in a mold. If a rigid sheet member is desired, a glass sheet can be provided and grooves formed in a front surface of the glass sheet. Another possible material for the sheet material is acrylic plastic or polycarbonate. One form of suitable acrylic sheet material is sold under the trade mark Plexiglas. Such a rigid sheet member can have grooves formed in its front surface by means of a laser etching step. As laser etching is a known process, a detailed description herein is deemed unnecessary. This process involves using one or more laser beams to burn away the glass surface in a precise manner to form smooth angular grooves in the surface. This manufacturing step is indicated at 102 in FIG. 9. Then by using one of the manufacturing steps already described, a reflective metallic layer is formed on the front surface of the sheet member so that the reflective layer conforms to and is shaped by the series of grooves. In this way a series of adjacent angular grooves are formed and these define pairs of elongate, reflective facets with smooth surfaces, as described above. The formation of the reflective metallic layer is indicated at 104 in FIG. 9. As indicated, one way of forming this reflective layer is by pressing a flat reflective layer of foil into the parallel grooves of the sheet member. An alternative way of providing the reflective metallic layer is by vacuum deposition. Then in step 106, a transparent, hardenable plastic material in a liquid or plasticized state is applied to the metallic layer so as to fill the angular grooves 78. In the final step 108, this plastic material is allowed to harden, for example by curing, thus forming a smooth front surface of the sheet material.

Another way of forming the sheet member using a flexible plastic sheet is by roll forming the series of grooves in the plastics sheet in at least one surface thereof. In the same or a subsequent roll forming step the reflective metallic foil layer can be applied over the area of the grooves. The remaining steps in this process would correspond to steps 106 and 108 of FIG. 9.

Instead of the sign construction illustrated in FIGS. 1 to 3 which has a rear background, as indicated the planar support for the sign can also be provided by a clear frontal sheet made of clear glass or a suitable clear rigid plastic such as acrylic plastic. In this variation a thin background layer, such as 2 mil vinyl, with letters etc, formed therein is adhesively bounded to the rear surface of the glass using an adhesive layer provided on the background sheet. The reflective sheet member described above then forms a rear layer that is adhesively bonded to both the background layer and, through the openings in the background layer, to the front glass sheet. The adhesive bond can be accomplished by applying a clear layer of adhesive to the front surface of the reflective sheet member.

While the present invention has been illustrated and described as embodied in several exemplary embodiments, for example, embodiments particularly suitable for manufacturing signs having reflecting surfaces, it is to be understood that the present invention is not limited to the details shown herein, since it will be understood that various omissions, modifications, substitutions and changes in the forms and details of the disclosed sheet materials, signs and methods of manufacture may be made by those skilled in the present art without departing in any way from the spirit and scope of the present invention. For example, those of ordinary skill in the art will readily adapt the present disclosure for various other applications without departing from the spirit and scope of the present invention.

I claim:

1. A reflective sheet material for signage, vehicle surfaces, and building surfaces, comprising:
    a sheet member constructed of rigid material and having a series of adjacent parallel primary grooves extending across at least one surface, each primary groove defined by first and second elongate facets forming an angle of at least 90 degrees in a first plane perpendicular to the at least one surface and perpendicular to the lengthwise direction of the facets, said grooves having a depth which is less than the thickness of the sheet member, each first facet having a width extending in said first plane substantially shorter than a corresponding width of said second facet, said first facet extending at an angle ranging between 60 and 80 degrees to a second plane defined by top edges of the groove defined by the respective facets, and said second facet extending at an angle ranging from 10 and 30 degrees to said second plane;
    a thin opaque reflective layer extending over and attached to said at least one surface in the region of said series of primary grooves, said reflective layer conforming to said series of primary grooves so as to form a series of associated angular grooves defined by elongate reflective facets; and a transparent material extending over and substantially filling said associated angular grooves in the reflective layer, wherein said transparent material forms a substantially smooth outer surface of said sheet material located at or close to top edges of said angular grooves, wherein said sheet material is substantially rigid.

2. A reflective sheet material according to claim 1 wherein said reflective layer is made of thin metal foil.

3. A reflective sheet material according to claim 2 wherein said metal foil comprises aluminum or gold.

4. A reflective sheet material for signage, vehicle surfaces, and building surfaces, comprising:
- a sheet member constructed of rigid material and having a series of adjacent parallel primary grooves extending across at least one surface, each primary groove defined by first and second elongate facets forming an angle of at least 90 degrees in a first plane perpendicular to the at least one surface and perpendicular to the lengthwise direction of the facts, said grooves having a depth which is less than the thickness of the sheet member;
- a thin opaque reflective layer extending over and attached to said at least one surface in the region of said series of primary grooves, said reflective layer being made of a thin metal foil and conforming to said series of primary grooves so as to form a series of associated angular grooves defined by elongate reflective facets; and
- a transparent material extending over and substantially filing said associated angular grooves in a reflective layer, wherein said transparent material forms a substantially smooth outer surface of said sheet material located at or close to top edges of said angular grooves, wherein said sheet material is substantially rigid and said sheet material is substantially rectangular and has two opposite, parallel end edges and wherein said primary grooves and associated angular grooves extend at a substantial acute angle to said end edges.

5. A sign comprising:
- a reflecting substrate made of a reflective, substantially rigid sheet material comprising:
- a sheet member constructed of rigid material and having a series of adjacent parallel primary grooves extending across at least one surface each primary groove defined by first and second elongate facets forming an angle of at least 90 degrees in a first plane perpendicular to the at least one surface and perpendicular to the lengthwise direction of the facets, said grooves having a depth which is less than the thickness of the sheet member, each first facet having a width extending in said first plane substantially shorter than a corresponding width of said second facet, said first facet extending at an angle ranging between 60 and 80 degrees to a second plane defined by top edges of the groove defined by the respective facets, and said second facet extending at an angle ranging between 10 and 30 degrees to said second plane;
- a thin opaque reflective layer extending over and attached to said at least one surface in the region of said series of primary grooves, said reflective layer conforming to said series of primary grooves so as to form a series of associated angular grooves defined by elongate reflective facets; and
- a transparent material extending over and substantially filling said associated angular grooves in the reflective layer, wherein said transparent material forms a substantially smooth outer surface of said sheet material located at or close to top edges of said angular grooves; and
- an opaque cover layer extending over and connected to said substrate and having at least one opening formed therein defining at least one indicium, a portion or portions of the reflecting substrate being revealed through said at least one opening, wherein said associated angular grooves face towards said cover layer.

6. A sign comprising:
- a reflective substrate made of a reflective sheet material constructed from a sheet member having a series of adjacent parallel primary grooves extending across at least one surface, each primary groove defined by first and second elongate facets forming an angle of at least 90 degrees in a plane perpendicular to the at least one surface and perpendicular to the lengthwise direction of the facets, said grooves having a depth which is less than the thickness of the sheet member;
- a thin opaque reflective layer extending over and attached to said at least one surface in the region of said series of primary grooves so as to form a series of associated angular grooves defined by elongate reflective facets; and
- a transparent material extending over and substantially filling said associated angular grooves in the reflective layer, wherein said transparent material forms a substantially smooth outer surface of said sheet material located at or close to top edges of said angular grooves, and an opaque cover layer extending over and connected to said substrate and having at least one opening formed therein defining at least one indicium, a portion or portions of the reflecting substrate being revealed through said at least one opening, wherein said associated angular grooves face towards said cover layer and wherein said cover layer is a vinyl sheet which is bonded by adhesive to the smooth outer surface of said sheet material formed by said transparent material.

7. A sign according to claim 6 wherein said angle formed by the first and second facets of each groove is an obtuse angle, said first facet extends at an angle ranging between 60 and 80 degrees to a plane defined by top edges of the groove defined by the respective facets, and said second facet extends at an angle ranging between 10 and 30 degrees to said plane defined by the top edges.

8. A sign according to claim 6 wherein said primary grooves have a uniform maximum depth which does not exceed 40 percent of the maximum thickness of the sheet member.

9. A reflective sheet material for signage, vehicle surfaces and building surfaces, comprising:
- a sheet member made of glass or acrylic plastic having a series of adjacent parallel primary grooves extending across at least one surface, each primary groove defined by first and second elongate facets forming an angle of at least 90 degrees in a first plane perpendicular to the at least one surface and perpendicular to the lengthwise direction of the facets, said grooves having a depth which is less than the thickness of the sheet member;
- a thin opaque reflective layer extending over and attached to said at least one surface in the region of said series of primary grooves, said reflective layer conforming to said series of primary grooves so as to form a series of associated angular grooves defined by elongate reflective facets; and
- a transparent material extending over and substantially filling said associated angular grooves in the reflective layer, wherein said transparent material forms a substantially smooth outer surface of said sheet material located at or close to top edges of said angular grooves, wherein said sheet material is substantially rigid.

* * * * *